United States Patent [19]

Greig

[11] Patent Number: 5,127,116
[45] Date of Patent: Jul. 7, 1992

[54] PIPE JOINT

[75] Inventor: John M. Greig, Whitley Bay, United Kingdom

[73] Assignee: British Gas PLC, London, England

[21] Appl. No.: 669,418

[22] PCT Filed: Aug. 20, 1990

[86] PCT No.: PCT/GB90/01308

§ 371 Date: Apr. 1, 1991

§ 102(e) Date: Apr. 1, 1991

[87] PCT Pub. No.: WO91/02918

PCT Pub. Date: Mar. 7, 1990

[30] Foreign Application Priority Data

Aug. 22, 1989 [GB] United Kingdom ............... 8919068

[51] Int. Cl.⁵ .......................... F16L 47/00; F16L 9/14
[52] U.S. Cl. ................................. 285/294; 285/55; 285/915; 285/21
[58] Field of Search ............... 285/21, 55, 294, 368, 285/412, 915, 45

[56] References Cited

U.S. PATENT DOCUMENTS

| 2,374,574 | 4/1945 | Adams, Jr. ............... 285/412 |
| 2,668,344 | 2/1954 | Killian et al. ............. 285/294 X |
| 3,235,289 | 8/1966 | Jones ....................... 285/21 |
| 3,677,303 | 7/1972 | Martin ..................... 285/294 X |
| 3,968,552 | 7/1976 | Hunter ..................... 285/55 X |
| 4,049,480 | 9/1977 | Kutschke ................. 285/294 X |
| 4,530,521 | 7/1985 | Nyffeler et al. .......... 285/21 |
| 4,610,740 | 9/1986 | Nordstrom ............... 285/294 X |
| 4,643,457 | 2/1987 | Press . |
| 4,776,613 | 10/1988 | Pickey et al. ........... 285/294 X |
| 4,828,698 | 11/1989 | Gilchrist ................. 285/368 X |

FOREIGN PATENT DOCUMENTS

| 1914697 | 11/1968 | Fed. Rep. of Germany . |
| 1116572 | 6/1968 | United Kingdom . |
| 1251205 | 10/1971 | United Kingdom . |
| 2080476 | 2/1982 | United Kingdom . |
| WO79/01018 | 11/1979 | World Int. Prop. O. . |

Primary Examiner—Michael F. Trettel
Attorney, Agent, or Firm—Larson and Taylor

[57] ABSTRACT

A joint between pipes (12, 14) each having a liner (16, 18) of polyolefin such as polythene. The pipes are spaced apart and the liner protrudes from each and is joined to its neighbor by a fusion coupling (20). The pipes are interconnected by a shell (24, 26, 28) and epxoy cement grout (34) fills the space between the liner and the shell. The liner is inserted in the pipe after it has been reduced in diameter by passing it through a die. The pressure of gas or liquid within the liner in use is greater than the liner can withstand alone but the grout transfers pressure loading to the shell. In modifications the coupling is replaced by a PECAT coupling or by flanged couplings joined to the pipes by butt fusion or by electrofusion directly or using electrofusion couplers. The liner may be locked in position using electrofusion fittings to prevent change of dimensions by reversion.

9 Claims, 4 Drawing Sheets

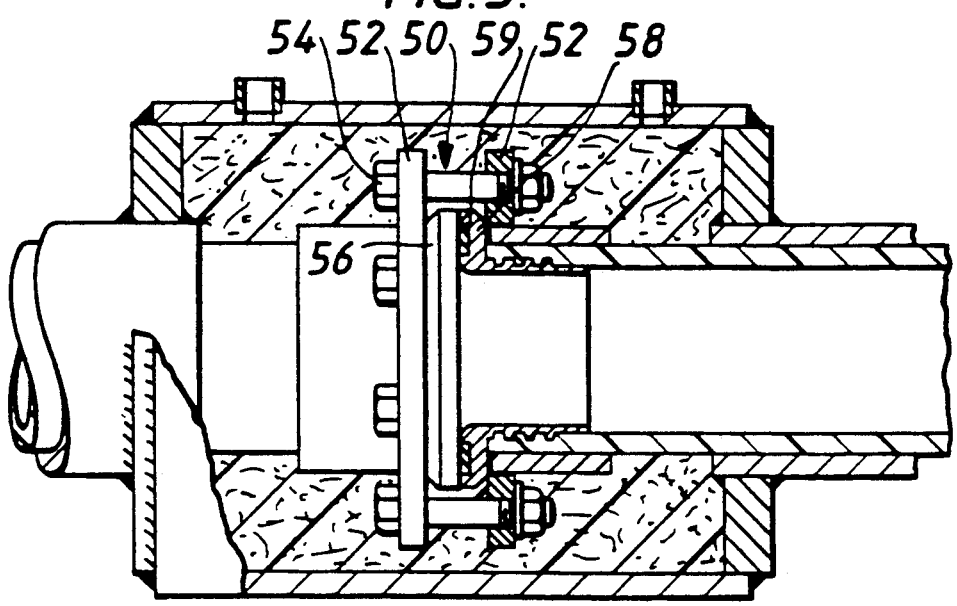
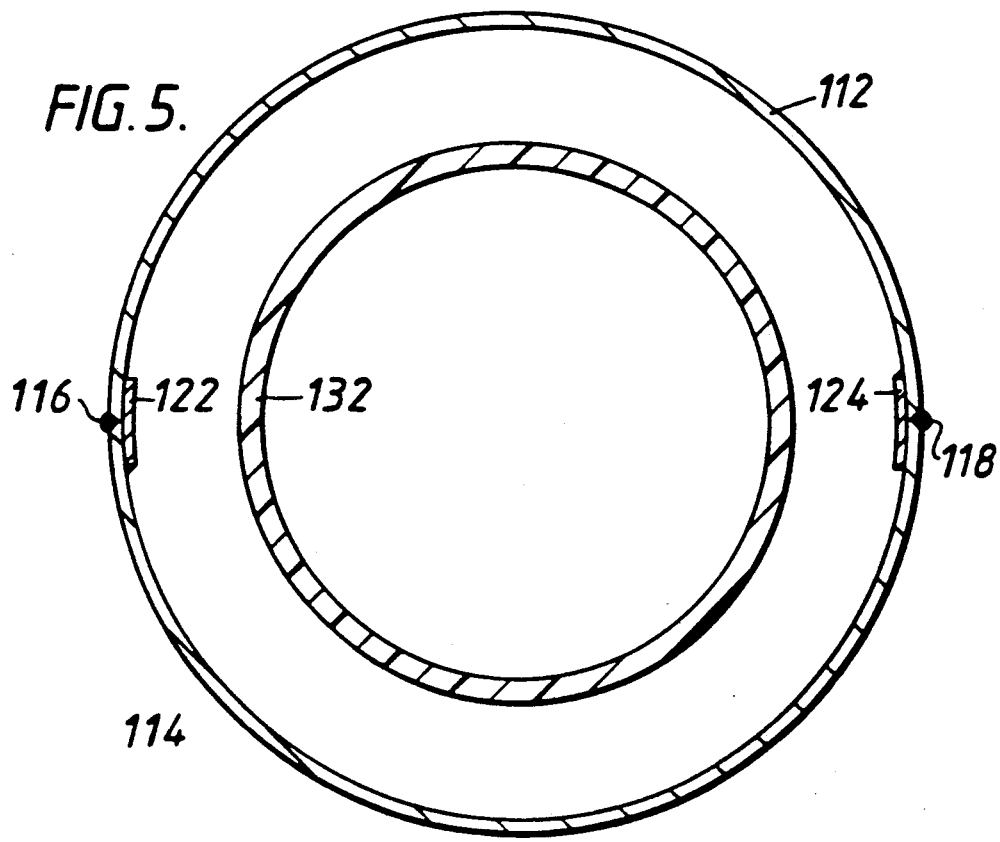

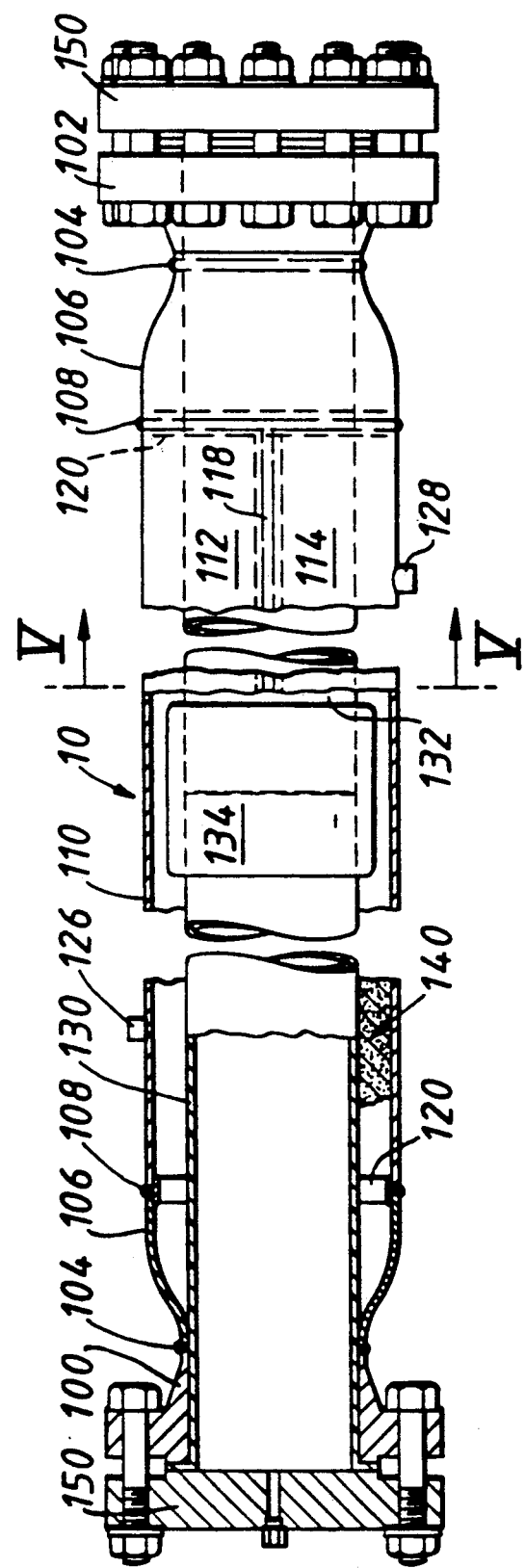

PIPE JOINT

The invention relates to pipe joints.

The joint is of particular interest with regard to pipes of the kind having a liner and suitable particularly, though not exclusively, for conveying liquids or gases at pressures higher than that which the unsupported liner is capable of withstanding.

In a particular example of such an application, long lengths of steel pipe are made up by welding end-to-end stock lengths (e.g. 38 foot) of pipe of, say, 14-inch diameter (355 millimeter). This long length is lined with a liner of polyolefin material by pulling the liner through a die to reduce its diameter and pulling it through the pipe. Subsequently, the liner is allowed to revert towards its original size and in so doing it tightly engages the pipe wall. This procedure is repeated and the long lengths of lined pipe are joined end-to-end using the joint according to the invention. Further long lengths are joined to complete the pipeline.

The lengths of pipe are supported on scantlings, for example, and each pipe is pulled up to its neighbour by hydraulic jacks before the joint is effected. The scantlings allow the pipe to slide at this stage. Afterwards the scantlings may be secured to the pipeline.

According to the invention a joint for pipes, each of which contains a liner of polyolefin, comprises two pipe end portions spaced apart with their liners protruding from the end portions and joined by joining means, a shell interconnecting the pipe end portions, and grout in the space between the liners and the shell.

In one preferred embodiment the joining means comprises an electrofusion coupling.

In another preferred embodiment the joining means comprises flanges having seal means pulled together by bolts.

Embodiments of joint will now be described by way of example with reference to the accompanying drawings, in which:

FIG. 3 is a longitudinal section through the second embodiment of joint;

FIG. 4 is a longitudinal section through test rig for an example of the joint;

FIG. 5 is a section on the line V—V shown in FIG. 4; and

Figure 1:
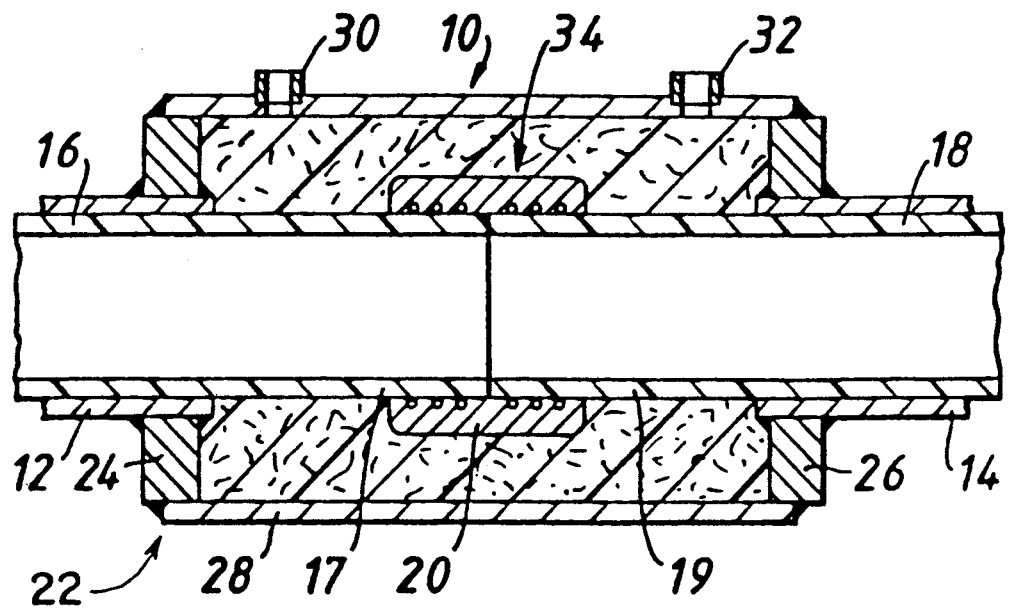
FIG. 1 is a longitudinal section through the first embodiment of joint.

In FIG. 1 there is shown a joint 10 comprising two pipe end portions 12, 14 spaced apart, with the liner 16, 18 within the pipes protruding at 17, 19 from the end portions 12, 14. The line 16, 18 is of medium-density polyethylene, for example, and the liners are joined by joining means in the form of a electrofusion coupling 20. This is a hollow body of polyethylene open at each end and having a heating element by which it can be heated and caused to fuse itself and the pipe to which it bonds.

The pipe end portions 12, 14 are interconnected by a shell 22 which is made up of two flanges 24, 26 secured by welding to the pipe end portions 12, 14, respectively, and a cylindrical shell wall 28 secured by welding to the flanges 24,26. The shell wall 28 has ports 30, 32 by means of which grout 34, such as epoxy or ordinary cement, for example, can be injected.

The pipes are nominally, for example, 14-inch (355 mm) in diameter and are of high pressure, steel construction with a pipe wall of three eights of an inch (9 mm) thick. The liner is relatively thin and is preferably of at least 8 mm thickness where the pipe is of 14-inch size. The pressure, which is sustained within the liner is, in this example, at least 350 psi. This joint is suitable however for use at much higher pressures.

The pressure in the liner is greater than the liner could withstand alone. However, the presence of the grout between the liner and the shell supports the liner and the pressure load is effectively transferred through the epoxy cement to the shell.

The individual stock lengths of pipe are joined by butt welding in the field to make up a long length of pipe which is then joined, using the joint of the present invention, to another long length or to several long lengths. The end stock lengths of pipe in such assemblies are pipes having a high pressure flange such as 24, or 26, at one end, each such flange having been secured by welding in the factory in the course of manufacture of the stock length.

In making the joint, the protruding ends 17, 19 of the liners 16, 18 are preferably carefully cut to the appropriate length to facilitate the making of the joint. The shell wall 28 is loosely placed surrounding one of the pipe lengths 16, 18 before the pipes are joined.

Figure 2:
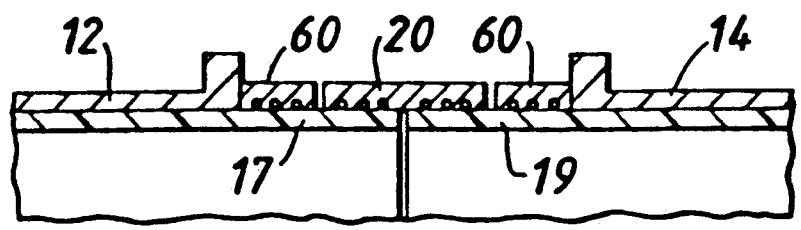
FIG. 2 is a scrap longitudinal section showing a modification of FIG. 1.

In order to improve accuracy, as shown in FIG. 2 a half or full electrofusion fitting 60 is preferably fitted around each protruding end 17, 19 and butts up to the pipe end 12, 14. The heating elements are energised so that the electrofusion fittings are bonded to the liners. This locks the liner relative to the pipe 12, 14. Otherwise, the liner might continue to revert to its original size following its recent pulling through the die and pipe and so cause the protruding end 17, 19 to reduce in length. Such locking fittings are locked in place before any cutting of the protruding ends 17, 19 takes place. The electrofusion coupling 20 is finally loosely placed in position.

Powerful jacks are used to pull the pipes together. The scantlings on which the pipes are supported are free to allow this to happen at this stage. The electrofusion coupling 20 is energised when the pipes have been fully pulled together to bond it to the protruding ends 17, 19.

The shell wall 28 is positioned on the flanges 24,26 and welded in place. Epoxy cement, or some other cement or grout, is injected through one of the ports 30,32. Air is ejected through the other port. More than two ports may be provided to facilitate the injection of grout.

The locking fittings referred to above help to reduce outward flaring of the protruding ends 17, 19. Where the protruding end 17,19 is not quite large enough to match the fitting 20, a stainless steel insert may be knocked into the liner to expand it slightly to correctly match the coupling 20 and end 17, 19.

Instead of using an electrofusion coupling 20 FIG. 3 shows a joint 50 in the form of a joint comprising flanges 52 pulled together by bolts 54. The joint 50 may, for example, be of the type known as a PECAT available from R. M. Fabrications Limited of 2 Paddock Road West Pimbo Skelmersdale Lancs WN8 9PL. The flanges 52 engage further flanges 56,58 which have seal means 59 pulled together by the bolts 54.

Figure 6:
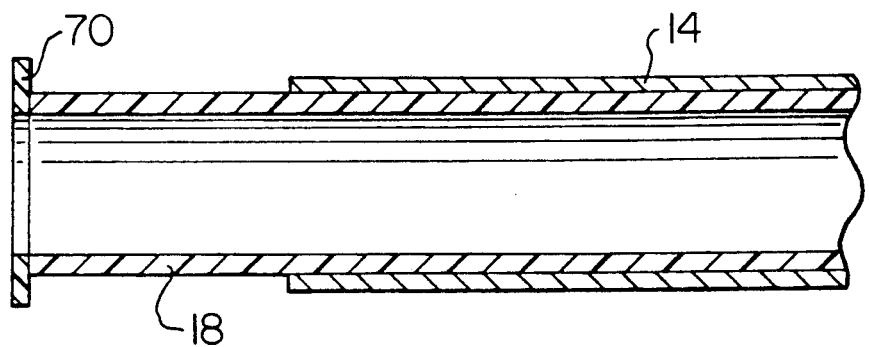
FIGS. 6 and 7 are sectional side elevation views showing flanges for joining pipe liners in accordance with the invention.
Figure 7:
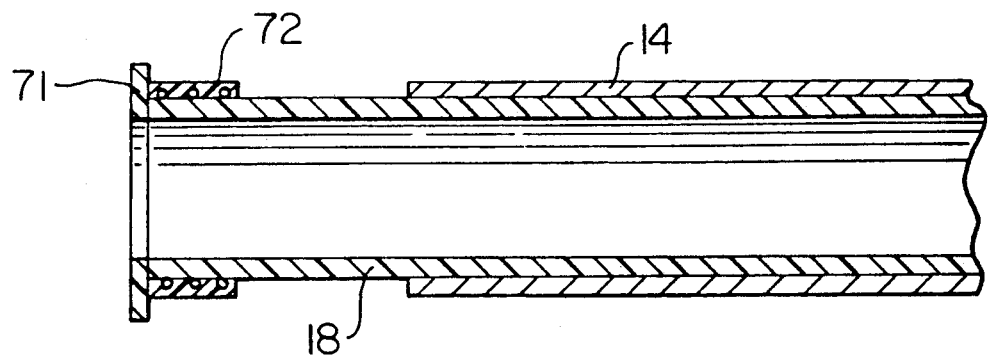

Further alternatives for the joint between the liners 16, 18 (70, shown in FIG. 6) is to use flanges which are butt-fusion welded or flanges 71, shown in FIG. 7 joined by electrofusion couplers 72 to the liners 16.18; or to use flanges (not shown) which are integral with an electro-fusion fitting and so are themselves directly joined to the liners.

The flanges in each of the above-mentioned alternatives each have a seal means and the two seal means are pulled together, to engage the seal means, by bolts passing through the flanges.

Once the join between the protruding ends 17, 19 has been made using a joint 50, or one of the other alternatives described, the shell wall 28 is positioned and secured by welding, and epoxy or other cement must not be allowed to affect the liner. A relatively thin section of epoxy is possible in the embodiment of FIG. 1. In the FIG. 3 embodiment a larger section is needed to accommodate the flanges and bolts.

An example of a test rig for the joint is shown in FIG. 4 and 5. The test rig shows a joint 10 with end flanges 100, 102 joined by welding 104 to concentric reducers 106. The reducers 106 are joined by welding 108 to a shell 110 made up of two longitudinally extending halves 112, 114. The halves are joined by two longitudinal welds at 116, 118.

Each welded join 108 comprises a backing strip 122, 124 welded to the half-shell 114, 112.

Inlets 126, 128 are provided in the half shells 112, 114.

In actual use of the joint shown in FIGS. 4 and 5 where the two pipes which required to be joined have plain ends (i.e. no flanges), the reducers are joined by welded joins at the smaller diameter ends to the pipe ends. In other words the flanges 100, 102 are not used and the joints at 104 are made to the pipe ends. The reducers are joined to the pipes before lining commences. The ends of the liner protrude from the pipe ends as shown at 130, 132. A join is made between the liner ends using an electrofusion coupler 134 (as explained above).

Then, the two half shells 112, 114 are assembled in place, each fitting on top of a backing strip 120 at each end. The shell halves are welded in position at their ends and along their longitudinal edges. Then, epoxy cement grout 140 is injected to fill the space between the liner 130, 132 and coupler 134.

Where it is required to join to a valve, the valve is fitted with flanges at its ends and the flange e.g. 100 is used. The valve typically, for example, is internally coated with a corrosion-resistant coating which is brought out at its flanges to form a flange of the coating. Therefore, a short length of liner is connected to the valve with a flange formed of liner extending outside the flange 100 which sealingly joins to the flange of coating material. The joint is then made up to another pipe end using an electrofusion coupler as before and finishing with the shell and the grout.

It will be understood that in FIGS. 4 and 5 the joint is shown with blanking end plates 150 for test purposes. These plates are not used in real use of the joint. In real use the joint shell terminates either in two reducers 106 as described or else the flanges 100,102 are used for alternative purposes as described.

I claim:

1. A joint for polyolefin-lined high pressure steel pipes, each steel pipe having an inner polyolefin liner in direct contact with the steel pipe, said joint comprising:
   spaced apart end portions of said two steel pipes with their inner liners protruding therefrom, said protruding liners being joined at their protruding ends by joining means;
   a steel shell fixed to and interconnecting said spaced apart steel pipe ends, said shell forming an annular cavity surrounding said spaced apart steel pipe ends and surrounding said joined protruding liners; and
   grout filling said annular cavity.

2. A joint according to claim 1 wherein said joining means comprises an electrofusion coupling.

3. A joint according to claim 1 wherein said joining means comprises flanges having seal means pulled together by bolts.

4. A joint according to claim 3, wherein said flanges are joined to said liners by butt fashion.

5. A joint according to claim 3, wherein said flanges are joined to the liners by electrofusion couplings.

6. A joint according to claim 1 wherein each of said spaced apart pipe ends has an external flange fixed thereto and wherein said steel shell is fixed to said external pipe flanges.

7. A joint according to claim 6 wherein said flanges are fixed to said pipe ends by welding.

8. A joint according to claim 7 wherein said steel shell is fixed to said external pipe flanges by welding.

9. A joint according to claim 1 wherein each of said protruding ends of said liner is provided with an electrofusion fitting banded around said protruding end and butted up against the pipe end from which said linear protrudes.

* * * * *